US009015772B2

(12) United States Patent
Thompson et al.

(10) Patent No.: US 9,015,772 B2
(45) Date of Patent: Apr. 21, 2015

(54) INTERACTIVE GAMING CHANNEL VIDEO STREAM WITH NESTED FEATURES

(75) Inventors: Matthew J. Thompson, Torrance, CA (US); Richard F. Purpura, Orange, CA (US); Eric W. Adams, Los Angeles, CA (US); Andrew K. Shiozaki, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1310 days.

(21) Appl. No.: 11/955,214

(22) Filed: Dec. 12, 2007

(65) Prior Publication Data
US 2008/0141326 A1 Jun. 12, 2008

Related U.S. Application Data

(60) Provisional application No. 60/874,346, filed on Dec. 12, 2006.

(51) Int. Cl.
*H04N 7/20* (2006.01)
*H04N 7/173* (2011.01)
*A63F 13/30* (2014.01)
*H04N 21/2543* (2011.01)
*H04N 21/478* (2011.01)
*H04N 21/61* (2011.01)

(52) U.S. Cl.
CPC ............ *H04N 7/17318* (2013.01); *A63F 13/12* (2013.01); *A63F 2300/409* (2013.01); *H04N 21/2543* (2013.01); *H04N 21/4781* (2013.01); *H04N 21/6143* (2013.01)

(58) Field of Classification Search
USPC .......... 725/63–68, 70–71, 118, 148; 715/835; 463/40; 455/12.1, 452.1, 509
See application file for complete search history.

(56) References Cited

U.S. PATENT DOCUMENTS

| | | | |
|---|---|---|---|
| 5,630,757 A * | 5/1997 | Gagin et al. ..................... 463/43 |
| 5,642,153 A * | 6/1997 | Chaney et al. .................. 725/40 |
| 6,838,658 B2 | 1/2005 | Colin et al. |
| 6,893,348 B2 * | 5/2005 | Yamagami et al. ............. 463/43 |
| 7,587,736 B2 * | 9/2009 | Summers et al. ............... 725/95 |
| 2003/0192059 A1 * | 10/2003 | Soloff et al. .................. 725/131 |
| 2003/0199246 A1 * | 10/2003 | Friedman et al. ............ 455/3.01 |
| 2005/0021609 A1 | 1/2005 | Houghton et al. |
| 2005/0037706 A1 * | 2/2005 | Settle ........................... 455/12.1 |
| 2005/0155083 A1 * | 7/2005 | Oh et al. ....................... 725/133 |

(Continued)

FOREIGN PATENT DOCUMENTS

WO         03047710 A2    6/2003
WO    WO 03/047710 A2 * 12/2003 .............. A63F 13/12

OTHER PUBLICATIONS

EPO Communication dated Jan. 28, 2009 in European Patent Application No. 07254807.6 filed Dec. 12, 2007 by Matthew J. Thompson et al.

(Continued)

*Primary Examiner* — Jason Salce

(57) ABSTRACT

An interactive gaming channel presented on a monitor, with a plurality of transponders being used to present the games available at a given time. Such a channel in accordance with the present invention comprises a game selection screen, comprising a genre selection area and a game selection area, related to the genre selection area, wherein a viewer of the monitor selects a game to be played from a plurality of games.

19 Claims, 12 Drawing Sheets

(56) References Cited

U.S. PATENT DOCUMENTS

2006/0136964 A1* 6/2006 Diez et al. .................. 725/37
2008/0081699 A1* 4/2008 Haeuser et al. ............. 463/42

OTHER PUBLICATIONS

Hopkins, D.K.W. and Bigg, S.; "A Low Bit-Rate Television System for Satellite Transmission"; Jan. 1, 1993; pp. 5/1-5/6; XP006521051.

European Search Report and Search Opinion dated Jun. 2, 2008 in European counterpart Application No. 07254807.6 corresponding to U.S. Appl. No. 11/955,214, filed Dec. 12, 2007 by Matthew Thompson et al.

EPO Communication dated Dec. 7, 2010 in European Patent Application No. 07254807.6 filed Dec. 12, 2007 by Matthew J. Thompson et al.

EPO Summons to oral proceedings dated Aug. 11, 2011 in European Patent Application No. 07254807.6 filed Dec. 12, 2007 by Eric W. Adams et al.

Canadian Office action dated Jul. 12, 2011 in Canadian Patent Application No. 2614106 filed Dec. 12, 2007 by Eric W. Adams et al.

EPO Decision to refuse a European Patent application dated Dec. 21, 2011 in European Patent Application No. 07254807.6 filed Dec. 12, 2007 by Matthew J. Thompson et al.

* cited by examiner

INTERACTIVE GAMING CHANNEL VIDEO STREAM WITH NESTED FEATURES

CROSS-REFERENCE TO RELATED APPLICATIONS

This application claims the benefit under 35 U.S.C. §119(e) of provisional application Ser. No. 60/874,346, filed Dec. 12, 2006, entitled "INTERACTIVE GAMING CHANNEL VIDEO STREAM WITH NESTED FEATURES," by Eric W. Adams et al., which application is incorporated by reference herein.

BACKGROUND OF THE INVENTION

1. Field of the Invention

The present invention relates generally to satellite video systems, and in particular, to a method, apparatus, and article of manufacture for interactive gaming mosaic channel video streams with nested menu features.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to monitor 114 for viewing by a user. There can be more than one satellite transmitting from each orbital location and additional orbital locations without departing from the scope of the present invention.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Alternatively, uplink facilities 118 can send signals via cable 122 either in conjunction with uplink signals 116 or instead of uplink signals 116 to IRD 112, for display on monitor 114.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz, or in the Ka-band of frequencies, i.e., 18-40 GHz, but typically 20-30 GHz.

As satellites 102-106 broadcast additional services and additional channels to viewers, viewers will like and expect to see programming on monitor 114 that relate to their specific needs and desires.

SUMMARY OF THE INVENTION

To minimize the limitations in the prior art, and to minimize other limitations that will become apparent upon reading and understanding the present specification, the present invention discloses an interactive gaming channel presented on a monitor, with a plurality of transponders being used to present the games available at a given time. Such a channel in accordance with the present invention comprises a game selection screen, comprising a genre selection area and a game selection area, related to the genre selection area, wherein a viewer of the monitor selects a game to be played from a plurality of games.

Such a channel further optionally comprises each transponder in the plurality of transponders being used to send only a portion of the interactive gaming channel, each transponder in the plurality of transponders using less than a full viewer channel's bandwidth to send the portion of the interactive gaming channel, each transponder sending only a portion of the plurality of games, each transponder in the plurality of transponders using less than a full viewer channel's bandwidth to send the portion of the plurality of games, a receiver, for receiving plurality of games and the interactive gaming channel from the plurality of transponders, the receiver further comprising a gaming platform, the interactive gaming channel comprising a plurality of genres of games, each genre of games in the plurality of genres of games comprising games specific to a given gaming platform, at least one genre of games having a restricted access, and the interactive gaming channel having a restricted access.

An apparatus for displaying an interactive gaming channel with a plurality of transponders sending signals used to present the games available at a given time in accordance with the present invention comprises a broadcast delivery system, comprising a transmitter and a receiver, a monitor, coupled to the receiver, for selectively displaying the interactive gaming channel, the interactive gaming channel comprising a game selection screen, a genre selection area, and a game selection area, from wherein a game selected from a plurality of games is selectively chosen, a processor, coupled to the monitor and the receiver, the processor processing the signals from the plurality of transponders, and an input device, coupled to the processor, for inputting at least one selected game into the processor.

Such an apparatus further optionally comprises the broadcast delivery system being a satellite television delivery system, each transponder in the plurality of transponders being used to send only a portion of the interactive gaming channel, each transponder in the plurality of transponders using less than a full viewer channel's bandwidth to send the portion of the interactive gaming channel, each transponder sending only a portion of the plurality of games, each transponder in the plurality of transponders using less than a full viewer channel's bandwidth to send the portion of the plurality of games, a receiver, for receiving plurality of games and the interactive gaming channel from the plurality of transponders, the receiver further comprising a gaming platform, the interactive gaming channel comprising a plurality of genres of games, each genre of games in the plurality of genres of games comprising games specific to a given gaming platform, and at least one genre of games having a restricted access.

The present invention is an interactive mosaic channel video with nested menu features. The present invention uses leftover broadcasting space on multiple transponders to transmit gaming information which is combined at the receiver end of the system. The games are interactive and can be played by groups of friends as well as alone or within a household.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
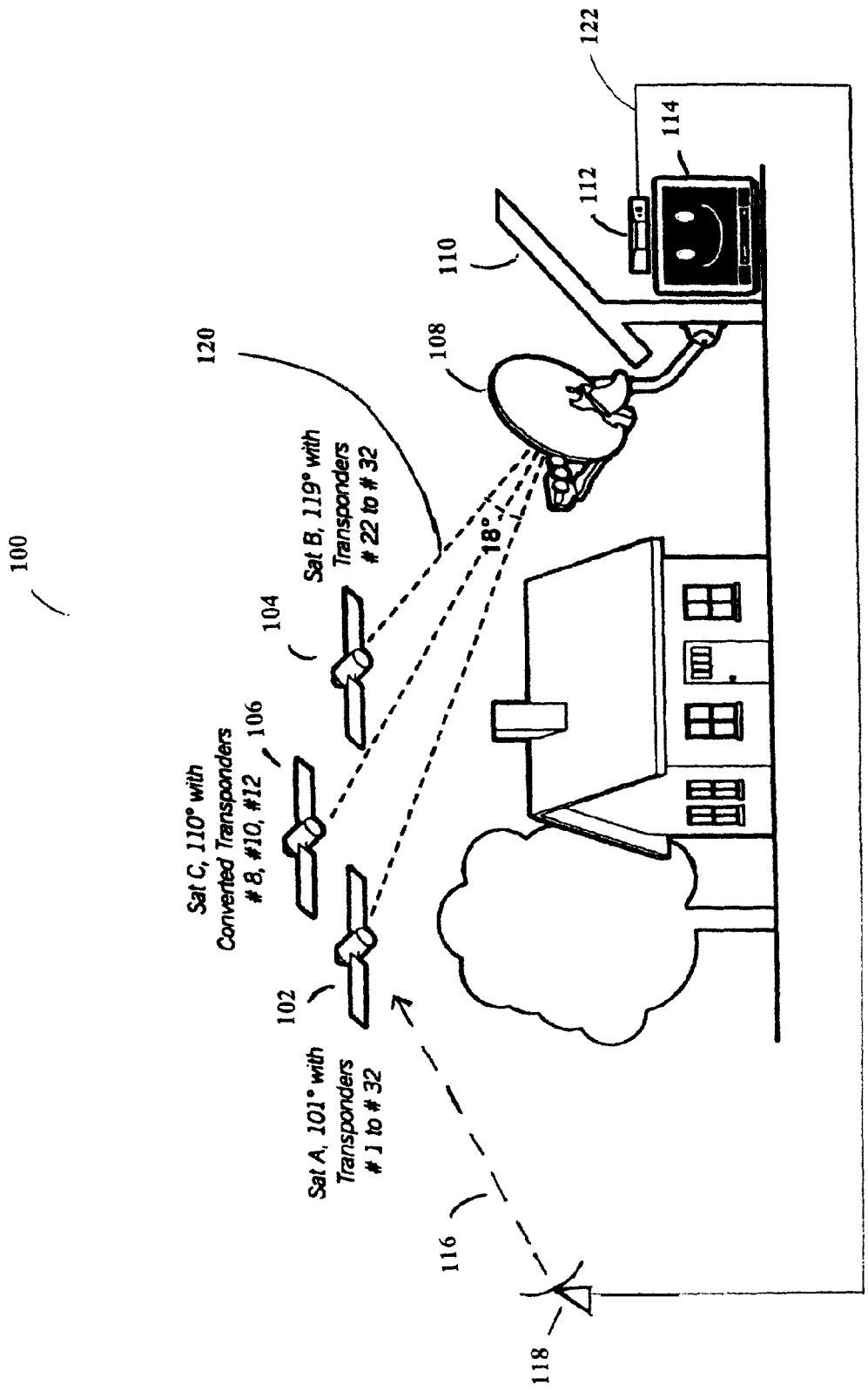
FIG. 1 illustrates a typical satellite television installation of the related art.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is an interactive gaming television channel that allows a viewer to view a video stream and select specific audio and/or video from the video stream based on a viewer's individual desires. The video stream is typically delivered to a user's monitor 114 via system 100, but could be done using cable or other terrestrial techniques.

When a viewer watches a specific program on a monitor 114, they are watching a "viewer channel" that comprises video and audio information that is routed to a specific "channel" to the monitor 114. For example, when a viewer wants to watch the local FOX affiliate station, they know that station is associated with a specific channel number on their monitor 114 or IRD 112, e.g., channel 11. When they program or otherwise indicate to the monitor 114 or IRD 112 to tune to channel 11, the monitor 114 or IRD 112 manipulates the electronics to capture and present the video information associated with that command from the satellite downlink 120, or from another source such as a coaxial cable 122 input (cable TV) or terrestrial broadcast frequencies to present that information on monitor 114. The "viewer channel" information is typically the information that is presented when a viewer selects a given "channel" on the monitor 114 or IRD 112.

The present invention provides a gaming channel that allows for viewers to play arcade and internet type games on their television sets, and play against friends and family members. The games are sent to the IRD 112 via extra space on transponders that do not have enough space to send another full channel, because the game information is much smaller than that required by a normal video channel.

The present invention also allows a viewer to select different games, different competitors, and different types of access to the channel based on viewer personal preferences. This presentation is typically referred to as an "interactive channel," an "interactive matrix channel," or an "interactive gaming channel" herein.

Within the interactive gaming channel, the viewer is given several choices of games to play. Further, the IRD 112 can comprise a gaming platform, such as an XBOX, XBOX 360, PlayStation, PlayStation2, PlayStation3, Game Cube, or other gaming platform, which would then allow for interactive gaming of other games via the system 100. There can be more than one interactive gaming channel as described above, and, as such each of the interactive gaming channels can have a thematic core, genre, or subject. For example, one interactive gaming channel can comprise all PlayStation games, other channels can comprise internet based games, still another channel can have educational games for children, etc.

The interactive gaming channel can be reached in a similar fashion to the other viewer channels available for viewing on monitor 114; the interactive mosaic channel can be selected from the programming guide, the interactive mosaic channel number can be entered directly on the remote control, or the interactive mosaic channel would be found when the user is "channel surfing" or using the "next higher or lower channel" button on the remote control or directly on the monitor 114 or IRD 112.

Interactive Gaming Channel Purchase Screens

Figure 2A:
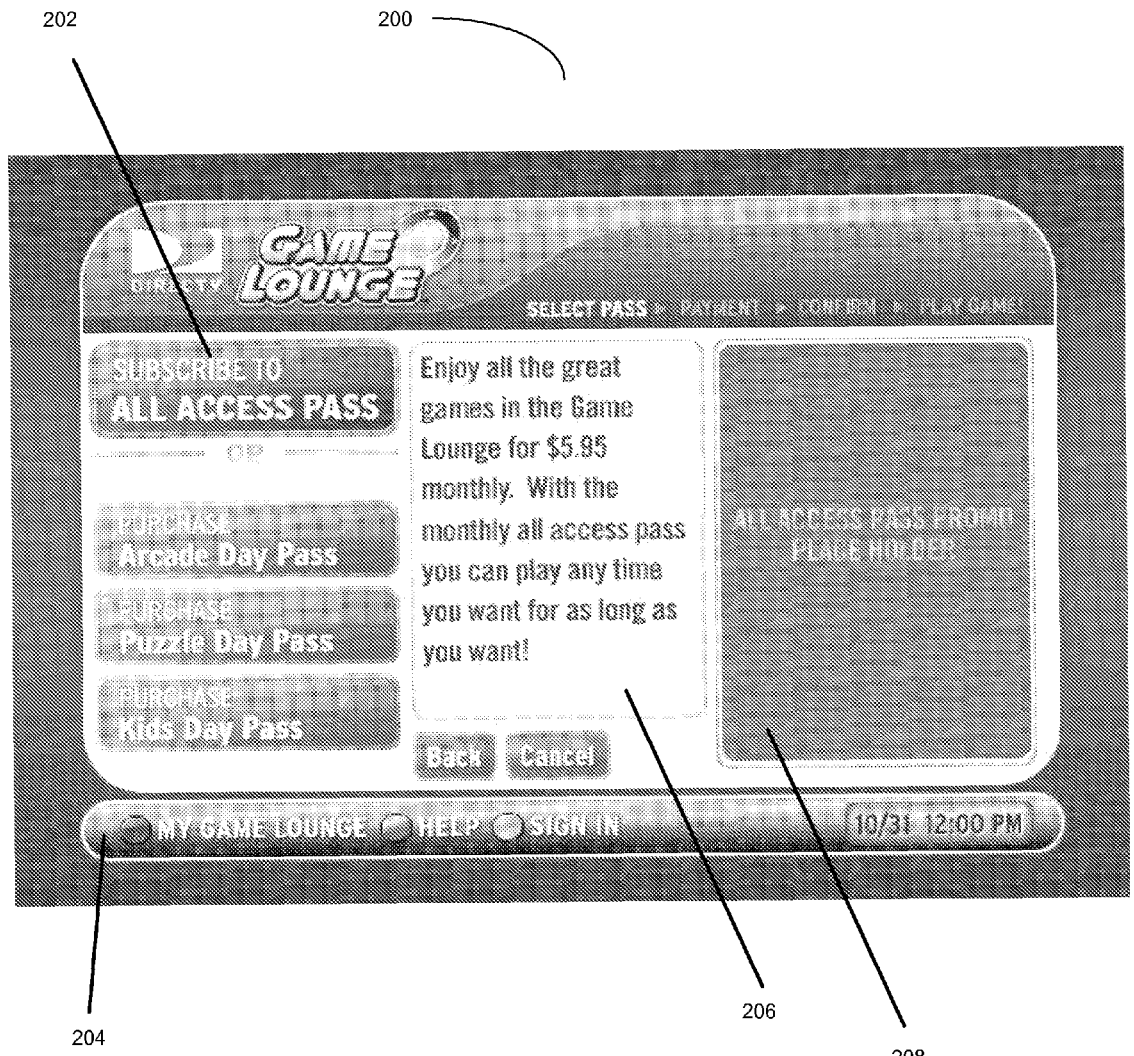
FIGS. 2A and 2B illustrates purchase screens in accordance with the present invention.
Figure 2B:
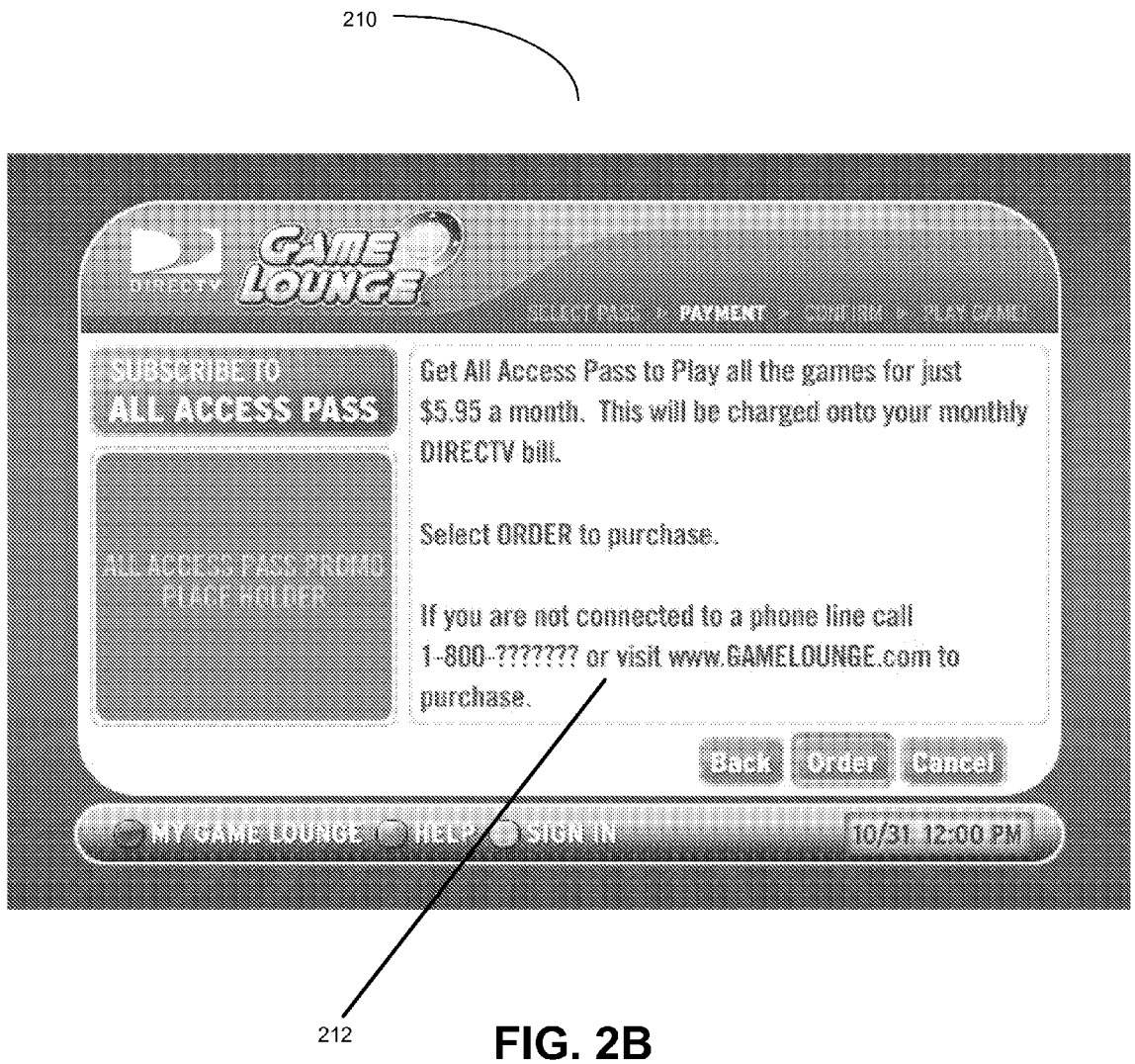

FIGS. 2A and 2B illustrate purchase screens in accordance with the present invention.

Interactive gaming purchase screen 200 is shown as being displayed on monitor 114. Within interactive mosaic channel 200, there are a number of selections 202 for access to the gaming channel 200, and a control bar 204. Text boxes 206 and 208 provide additional information to the viewer, such information may be related to the selection of a given box in selections 202.

Typically, as a viewer moves the cursor between the selections in selection 202 area, the text in box 206, and alternatively or collectively, the text in box 208, will change. For example, and not by way of limitation, when the cursor is on the "subscribe to All Access Pass" box in selection area 202, the text in box 206 can describe the benefits or features of that selection. Similarly, specific types of games can be selected and purchased, such as arcade type games, puzzle type games, children's games, specific gaming platform (e.g., XBOX, PlayStation, etc.) games, and other selections that would be available for purchase or subscription.

Control bar 204 allows a viewer to use specific buttons, e.g. the "color" buttons, on the remote control for IRD 112 and/or monitor 114 to obtain help, go to a "my game lounge" screen, or to register/sign in with the system to access previously played games, high scores, etc. Back and cancel buttons are also available for selection by the viewer to go back to the previous screen or to cancel the screen 200 as desired.

FIG. 2B illustrates screen 210, which typically appears after a user has made a selection in area 202. Typically, the user will move the cursor around in area 202 to make a selection, and then press a designated button on the remote control to indicate a specific selection, which would then indicate to IRD 112 and system 100 to display screen 210.

Again, back and cancel buttons are presented, as well as an "order" button, which allows the viewer to order the game channel selected in screen 200. Further, additional text in box 212 is presented, to give the viewer additional information, either about the viewer's selection, the features of the selection, what to do to order, as well as what to do if the user is not connected in a certain fashion to the system 100.

Remote Control

Figure 2C:
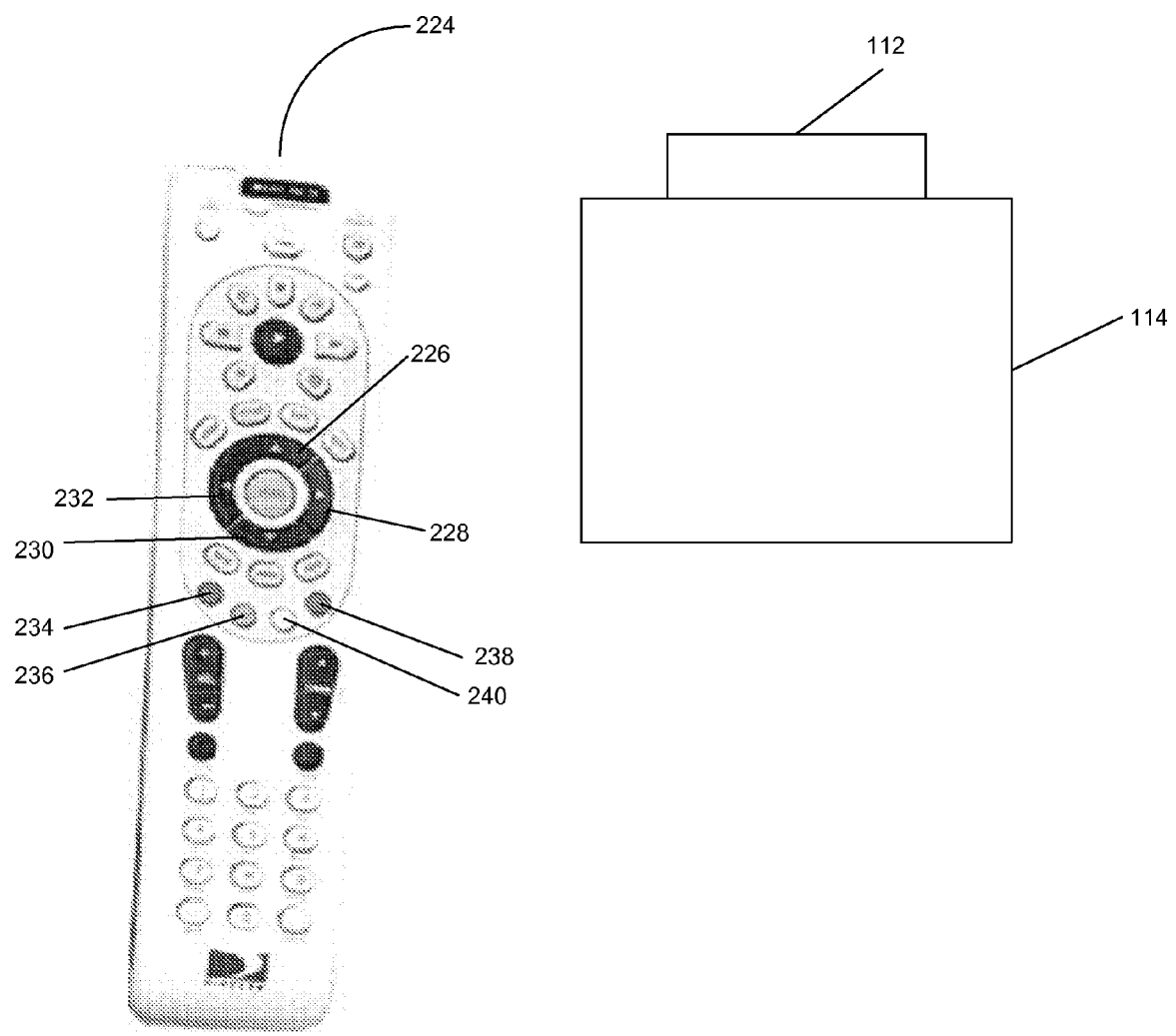
FIG. 2C illustrates a remote control used in the present invention.

FIG. 2C illustrates a remote control used in the present invention.

Typically, IRD 112 and monitor 114 are controlled by a remote control device 224, which allows viewers a convenient way to control audio volume, channel selection, and other features and display characteristics from a distance away from the IRD 112 and/or monitor 114.

To make selections in area 202, on control bar 204, and to select "back" "order" and "cancel" buttons on screens 200 and 210, each selection in area 202 and buttons shown has a cursor 220 surrounding that specific selection. This indicates that the specific video cell 202 and channel ID 212 has been selected by the viewer. The cursor 220 is typically controlled by buttons 226-232, but can be controlled by other buttons on the remote control 224 if desired.

By selecting a given gaming package or button on screens 200 and 210, the viewer is granted access to a portion or the complete gaming channel of the present invention, or moves among the screens available in the selected portions of the gaming channel.

When the cursor is moved to a given box in area 202 or to a button in screens 200 and 210, text boxes 206 and 208, as well as box 212, may undergo a change in information. As such, the viewer can "interact" with the interactive gaming channel and decide where to navigate within the interactive gaming channel, as well as play games on the interactive gaming channel as described herein.

Control Bar

The Control Bar 204 (also called the Attract Icon or the Attract Icon Bar) The control bar 204 allows for instant, on-screen access to several data sources that allow the viewer to access related data to that being shown in the screens 200 and 210, as well as other screens described herein. Those IRDs 112 that have interactive capabilities have special buttons resident on remote control 224 that correspond to the icons that appear on the control bar 210. Each icon/button directs the viewer to a different screen, such as the viewer's home game lounge screen, a help screen, a sign in or sign out screen, etc. Each screen can have sub-screens that further allow related data to be viewed or otherwise analyzed by the viewer.

For example, and not by way of limitation, one of the remote control 224 buttons, e.g., the "red" button 234, indicated by text and/or graphics on control bar 204, may take a viewer to the "My Game Lounge" page, where viewers can see which games to play, their high scores, etc. Similarly, a "help" page can be accessed by pressing a different button on the remote control 224, e.g., the "green" button 236, where viewers can get help navigating through the interactive gaming channel.

A "Sign in" page can also be accessed by pressing another button on the remote control 224, e.g., the "blue" button 238, indicated by graphics and/or text on the control bar 204, which provides the user the ability to create or access their customer gaming persona; what is called a 'Profile' on the system. This feature/process mirrors the functionality of XBOX Live. A system where there is client/server communication and data exchange. The receiver 112 (Game Lounge Client) communicates with the Game Lounge backend (server) to send and receive data related to the user's profile.

A profile on Game Lounge is used in the following ways. The first is the Sign In event where either the user creates a profile with associated validation credentials or signs into an existing profile using proper credentials. During this data transaction the backend server is transferring update profile information to the service to populate it. This information consists of profile rank, token/point values, friends list, and match results. The second event is when a player initiates a multiplayer match for cash or tokens. In cash games, a validation callback to the server occurs to verify funds before the multiplayer game and then immediately after to register results. In a token match results are posted (callback) in the background at regular hourly intervals. These automated update postings include registration of current token balance and Leaderboard placements. The user can also store their profile on the receiver (IRD 112) if desired.

Home Gaming Screen Features

Figure 3:
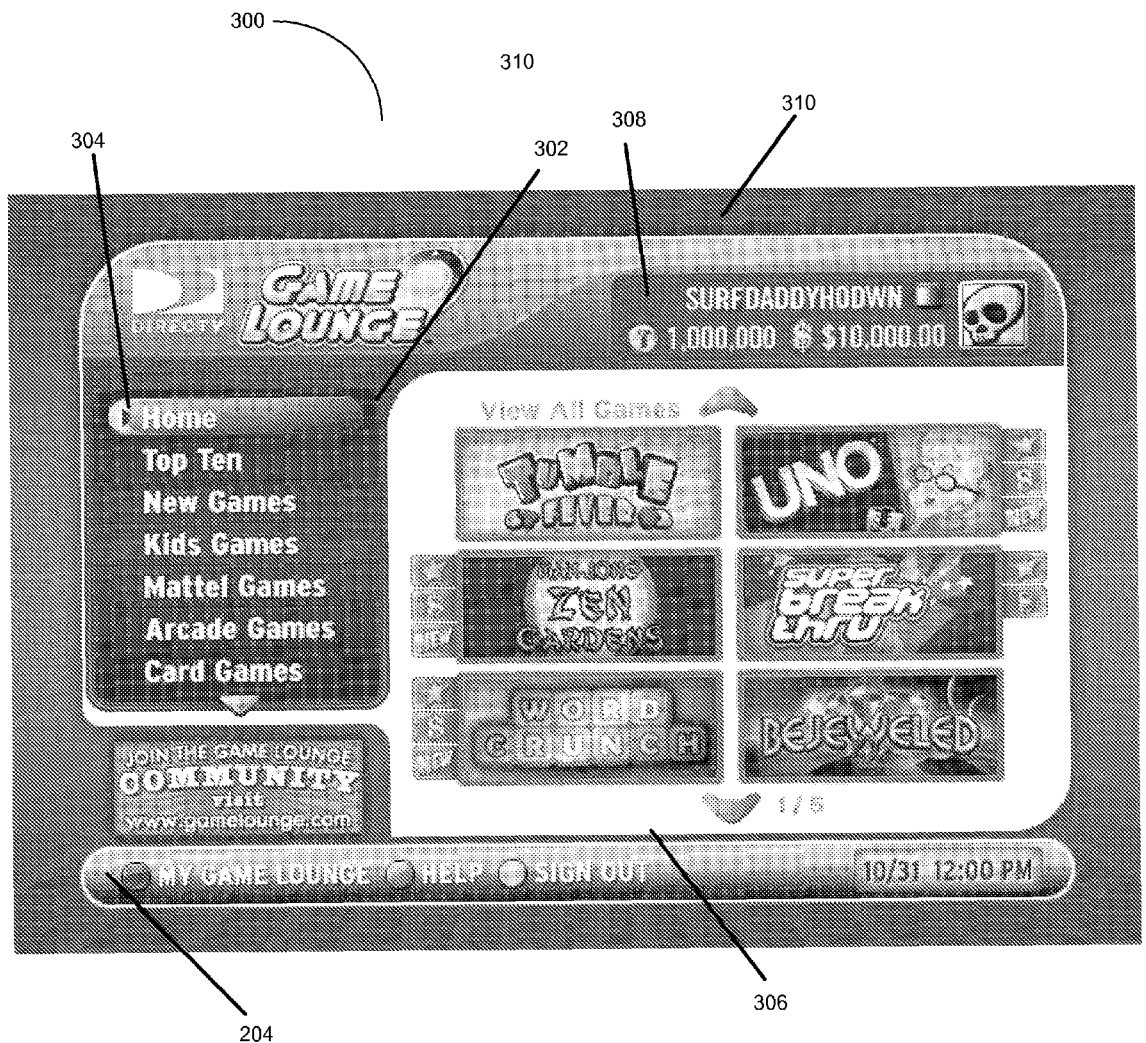
FIG. 3 illustrates a home gaming channel screen in accordance with the present invention.

FIG. 3 illustrates a home gaming channel screen in accordance with the present invention.

Screen 300 comprises a selection area 302, a cursor 304, control bar 204, a game selection area 306, a moniker screen 308, and a background video 310. Additional selection areas and other components of screen 300 may be added without departing from the scope of the present invention.

Once a viewer has paid the subscription prices or otherwise been granted access to the interactive gaming channel of the present invention, screen 300 is the main or home screen that such a viewer will be shown on monitor 300. The Screen 300 and the associated components 302-310 require a very small bandwidth for content delivery to IRD 112; as such, screen 300 and the associated components 302-310 can be sent to IRD 112 in small spaces on any transponder that is used in system 100, typically in bandwidth spaces that cannot carry a full viewer channel of video and audio information.

Within selection area 302, the viewer can use buttons on remote control 224 to scroll through choices, such as the most popular games, new games, children's games, or games of specific genres or gaming platforms. Several different types of game selections are available using selection area 302, through the use of cursor 304.

As cursor 304 is moved around in selection area 304 using remote control 224, the video presentation in area 306 will typically change. For example, when the top ten games selection is made in area 304, the top ten games will be displayed in area 306. When the children's games genre is selected in area 304, a different set of game selections will be shown in area 306.

The viewer will still have the option to make a quick selection of specific locations to tune to, such as the viewer's "My Game Lounge" or "Help" sections, via control bar 204 and the associated buttons 234-240 on remote control 224.

Further, area 308 indicates to the viewer which interactive gaming channel "user identification" that the viewer is currently playing. When a viewer registers with the interactive gaming channel, as discussed with respect to FIGS. 2A-2B, the viewer selects a screen name or moniker, and has a certain amount of bartering items to allow for game play. The user can also select an avatar or other portrait to be displayed when the moniker is being used, as well as for display to other users to help in describing the character or other nature of the viewer when a given screen name is chosen.

For example, and not by way of limitation, as shown in FIG. 3, the viewer has selected "SurfDaddyHodwn" as a screen name, and a stylized skull as an avatar. Further, the viewer, under this screen name, has one million tokens, which equates to ten thousand dollars, which can be used for game play, tournament entry, or for cash prizes, or any combination of the above.

As the viewer selects a choice in area 304, the viewer can also use remote control 224 to select specific games shown in area 306, typically by using buttons 226-232 on remote control 224. Once a game is highlighted, the "select" or "enter" button on remote control 224 is typically used to begin playing the selected game.

Game Genre Screen Features

Figure 4:
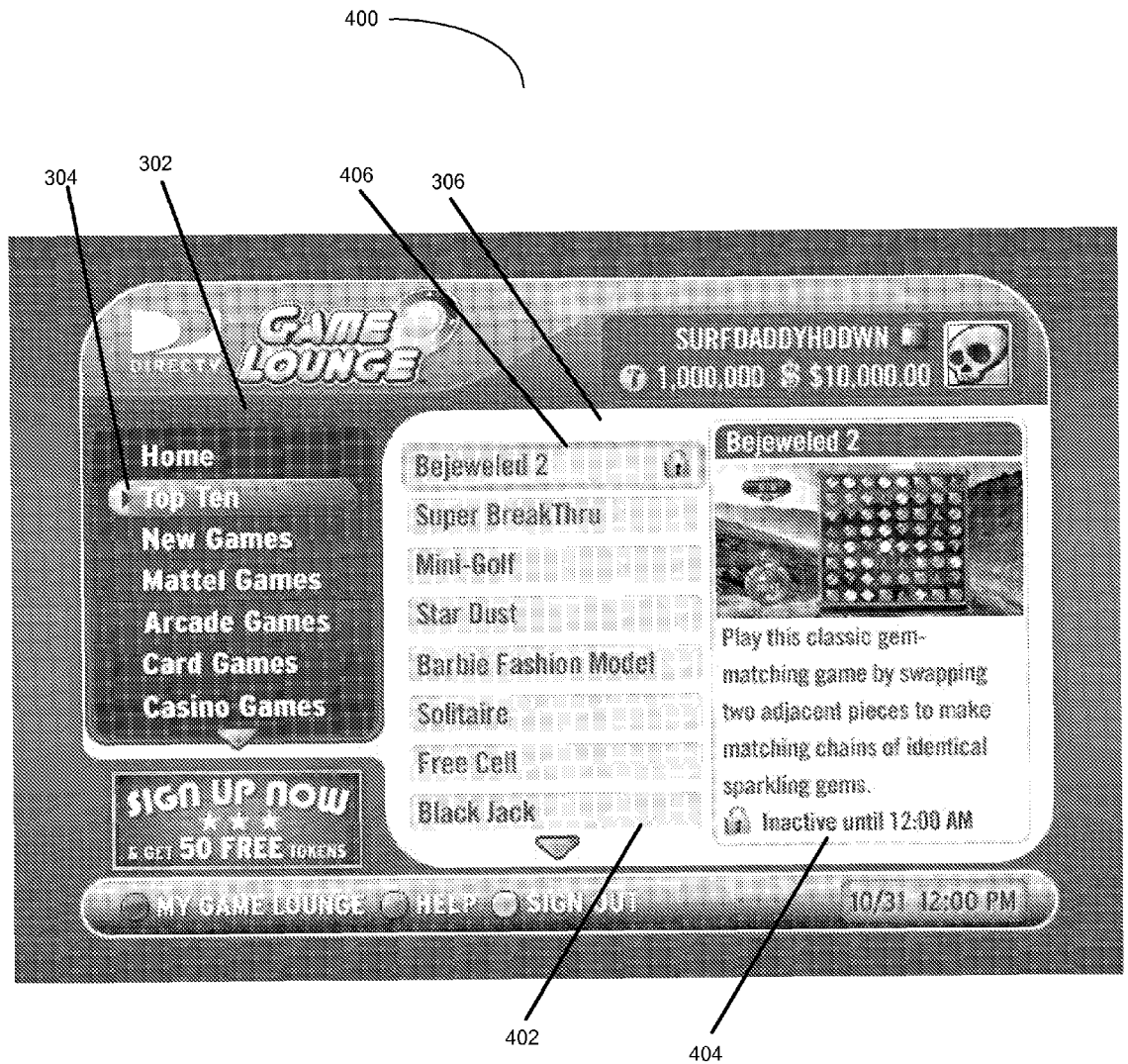
FIG. 4 illustrates a selection of a game genre within the interactive gaming channel of the present invention.

FIG. 4 illustrates a selection of a game genre within the interactive gaming channel of the present invention.

Screen 400 which is typically presented on monitor 114 shows the changes that occur when cursor 304 is moved within area 302. As shown in FIG. 4, when the cursor 304 is moved to a "Top Ten" game genre selection, area 306 changes character, and shows the top ten games that are played within the interactive gaming channel of the present invention. A list 402 of the top ten games is presented in area 306, and a short description and graphical display 404 is also displayed in area 306. As viewers scroll through the games in area 402 using the cursor 406 controlled by remote control buttons on remote control 224, the display 404 changes to match the cursor 406 highlighted selection. Additional symbols, such as the lock shown on the "Bejeweled 2" selection indicate to viewers that there are additional items associated with the selection of that particular game. For example, the lock shown in FIG. 4 indicates that the "Bejeweled 2" game is inactive until a certain time, perhaps because of over subscription or because the game is being repaired or altered within system 100. In a more common situation where the game is not in-schedule, selecting the game will display a seven day look ahead schedule that is updated daily. This schedule shows the upcoming days in text and when on future days the game is available. Other symbols may indicate that that game is a tournament only game, is an invitation only game, or may require additional payment to play or a specific gaming platform to operate on a particular viewer's IRD 112. Many symbols are possible within the scope of the present invention. Once a user moves the cursor in area 402 to the desired game, another remote control 224 button, typically the "Select" button, selects the game for the viewer to play.

Personal Profile Screen Features

Figure 5:
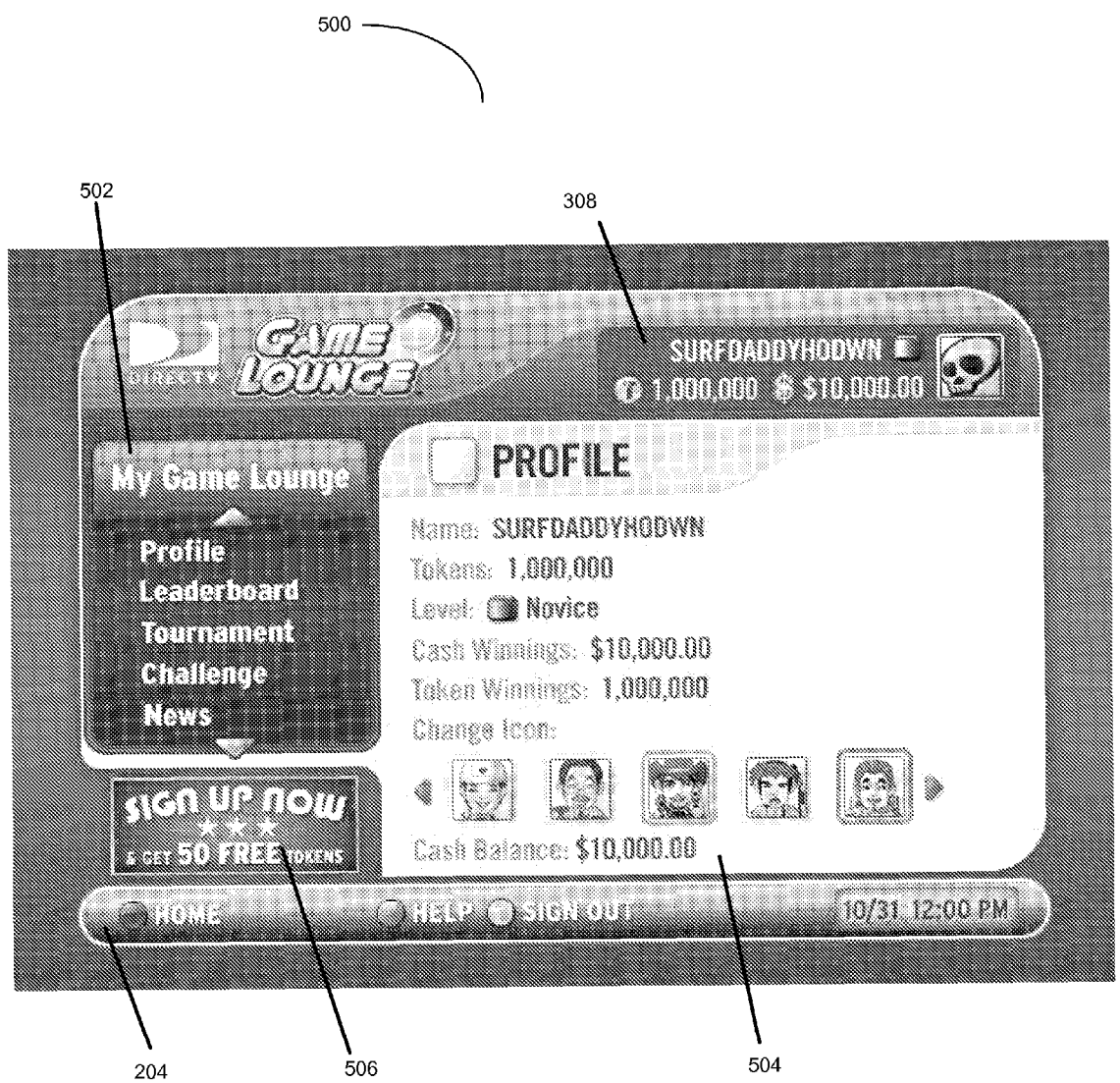
FIG. 5 illustrates a viewer's personal profile screen in accordance with the present invention.

FIG. 5 illustrates a viewer's personal profile screen in accordance with the present invention.

Screen 500 is displayed on monitor 114 when the "My Game Lounge" selection is made via control bar 204. Again, screen 500 comprises a selection area 502 and a display area 504, as well as control bar 204 and moniker screen 308, and optional area 506.

Selection area 502 allows a user to scroll through several personalized areas of the interactive gaming channel of the present invention, comprising a profile of the player/viewer, a leaderboard or leaderboards for winnings or high scores in given games, a tournament screen that allows the player to enter or track tournament play, a challenge area to allow a specific player to challenge other players to a given game, and other areas of interest to a specific viewer/player. As the viewer scrolls through the selections in selection area 502, the text and graphics in area 504 will change accordingly, such that the viewer is given additional information related to the selection in selection area 502.

For example, and not by way of limitation, when the profile selection is made in selection area 502, the screen name, cash and/or token balances, winnings, skill or attainment of level, and icon selection can be shown. Tokens can be equated to cash values or cash can be redeemed for tokens, similar to chips in a casino. Further, if a player wins a game, tournament, or performs at a given level in a game being offered, additional tokens or winnings can be credited to the viewer/player and can be tracked in screen 500.

Optional box 506 can provide related information to the viewer/player, e.g., to announce upcoming tournaments, special pricing, or other news related to the interactive gaming channel that may be of interest to the viewer/player.

Game Selection Screen

Figure 6:
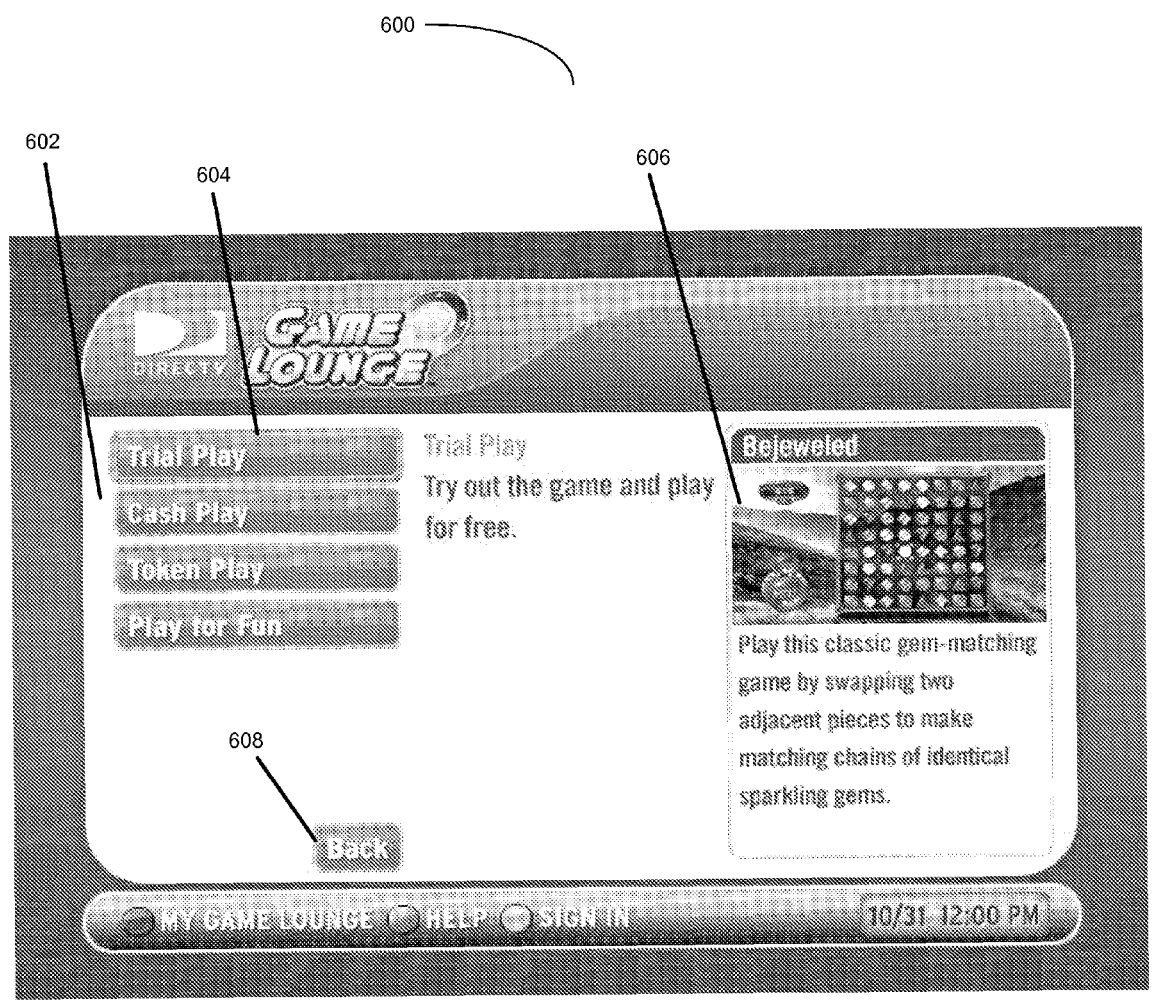
FIG. 6 illustrates a game selection screen in accordance with the present invention.

FIG. 6 illustrates a game selection screen in accordance with the present invention.

Game selection screen 600 is shown, with play selection area 602, cursor 604, description 606 and back button 608 shown within game selection screen 600.

When a specific game is selected from screens 300 or 400, the type of game play must be determined by system 100 via the interactive gaming channel of the present invention. As selected by cursor 604, the viewer/player can select a trial play, to see if the viewer/player enjoys the game or needs to learn the strategies for the game. The viewer/player can also select a "cash play" where the viewer/player pays cash, typically withdrawn from his winnings or charged to his system 100 account, or a "token play" where the tokens earned or purchased by the viewer/player are deducted from the viewer/player's account. Further, the viewer/player can "play for fun" rather than for winnings or entry into a tournament or other competitive arena for that given game. Some of the selections in area 602 may not be available for all games that are being presented in the interactive gaming channel of the present invention.

As the user scrolls cursor 604 (via the remote control 224) through the selections in area 602, the graphics and text in area 606 may change to reflect the position of the cursor 604. Further, if the user does not wish to play the game after seeing the price to pay, or the game strategy, genre, or if the game selected and shown in screen 600 is otherwise unappealing to the viewer/player, the viewer/player can select the back button 608 via the cursor 604 or via another button on remote control 224.

Challenge/Tournament Screen

Figure 7:
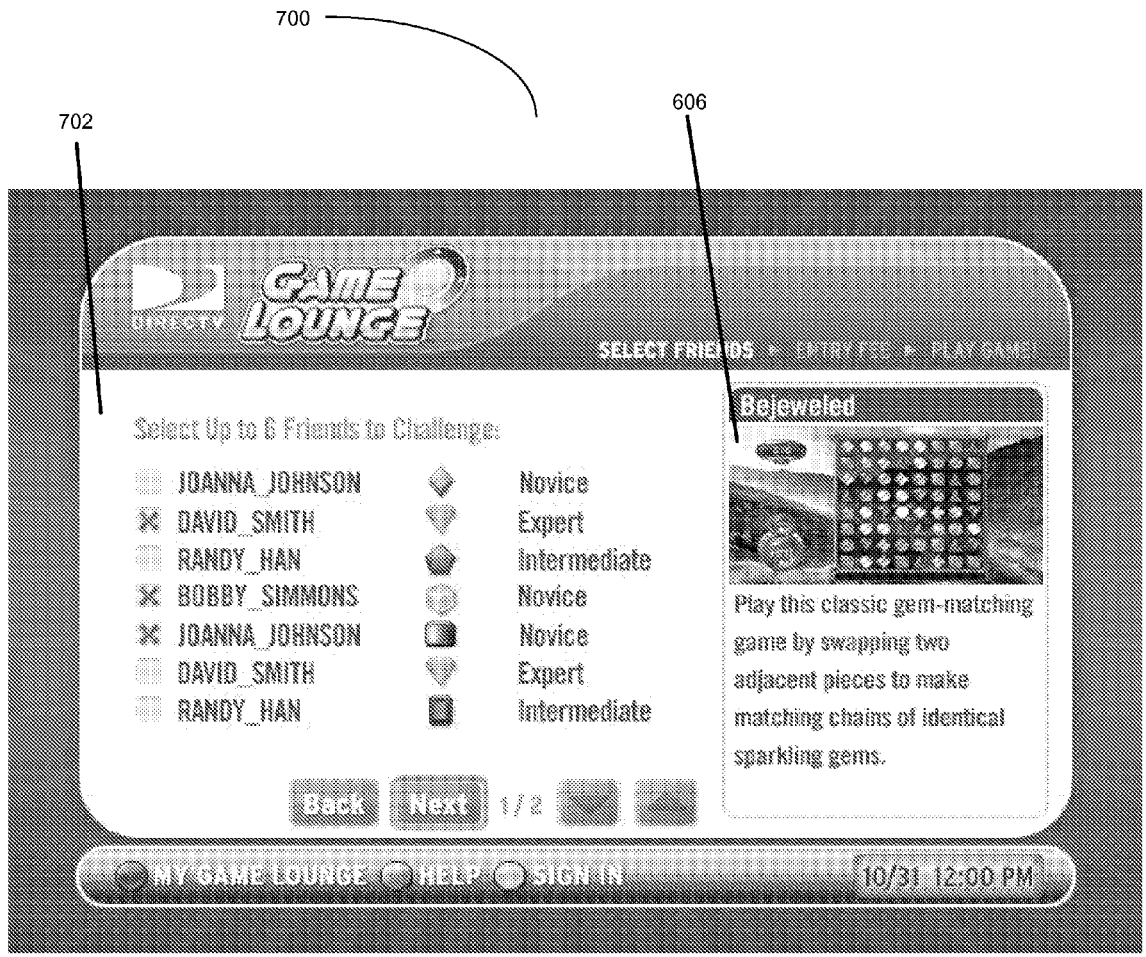
FIG. 7 illustrates a typical selection screen for a gaming challenge in accordance with the present invention.

FIG. 7 illustrates a typical selection screen for a gaming challenge in accordance with the present invention.

Friend selection screen 700 is shown, which comprises graphics 606 and selection area 702. Graphics 606 indicates the game that the viewer/player is challenging other people to play, and selection area 702 indicates the possible competitors for the game indicated in graphics 606. The viewer/player can select one or more competitors to challenge, and compete head-to-head or in other fashions, e.g., teams, round-robin, etc. for money, tokens, amusement, fun, or other objects of mutual agreement to the viewer/player and their selected challengers.

Typically each of the challengers is shown by screen name and/or system subscriber name, and some additional information is also indicated for each player, e.g., the level at which each potential competitor is proficient at the selected game, the level of the potential competitor's token or cash account values, etc. The viewer can also choose opponents that are current on their friends list. The viewer/player then selects their competitors and moves on to the next screen.

Figure 8:
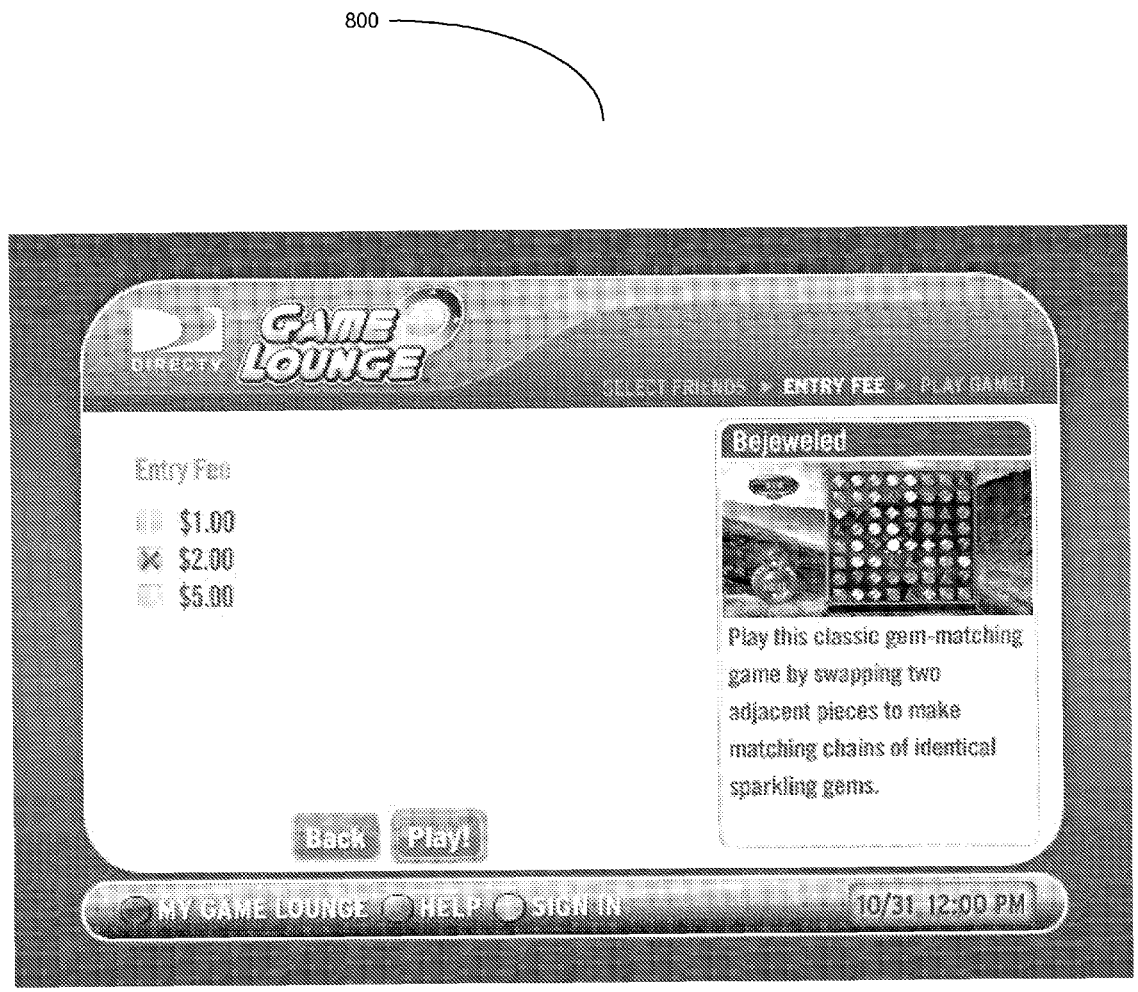
FIG. 8 illustrates a typical entry fee screen for the gaming challenge screen of FIG. 7.

FIG. 8 illustrates a typical entry fee screen for the gaming challenge screen of FIG. 7.

Entry fee screen 800 allows the viewer/player that is requesting the challenge to set an entry fee, whether that entry fee is in dollars or tokens, that will be required prior to any challenger entering the challenge. In essence, this determines the amount of the money available to the winner as winnings.

System 100 operator can, if desired, use part of the amount of money available for tournaments as a tournament sponsor fee, or "house" fee. Further, tournaments can be run where the entry fees are donated to charity, or part or all of the entry fees can be designated for other uses.

Other prizes can be awarded to the winner of such tournaments, such as other system 100 features, such as pay-per-view movies or specials at reduced or complimentary rates, additional channel access, etc. The type of prize for winners or the cost for entry into challenges or tournaments is not limited by the scope of the present invention.

Figure 9:
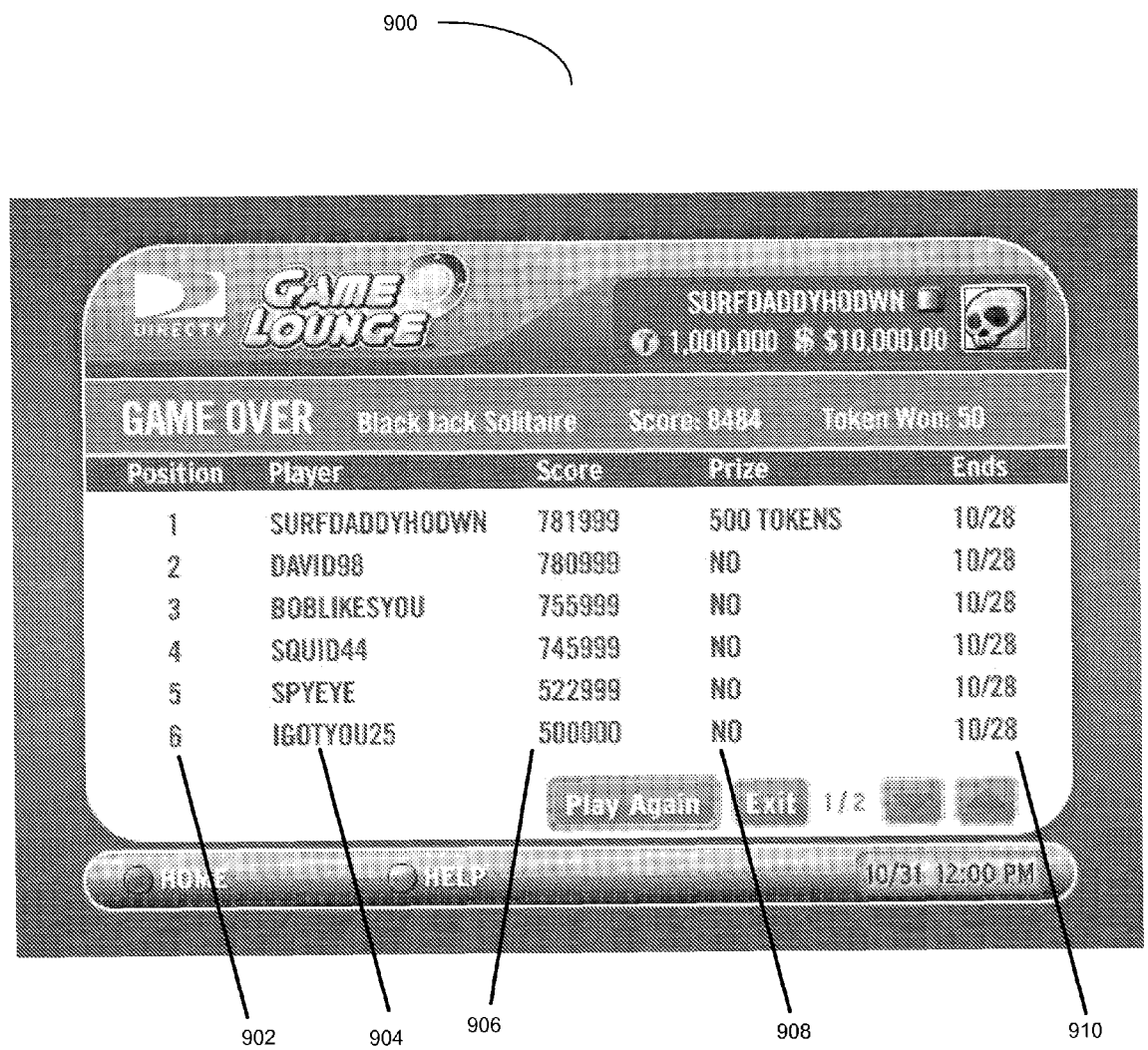
FIG. 9 illustrates a typical tournament scoring roster in accordance with the present invention.

FIG. 9 illustrates a typical tournament scoring roster in accordance with the present invention.

Screen 900 illustrates a challenge and/or tournament final position roster, with position 902, player name 904, score 906, prize 908, and the tournament/challenge end date 910 shown. Depending on how the tournament/challenge is structured, more than one player may win a prize in prize column 908, and multiple sessions of each game may be played to determine the score shown in column 906.

Figure 10:
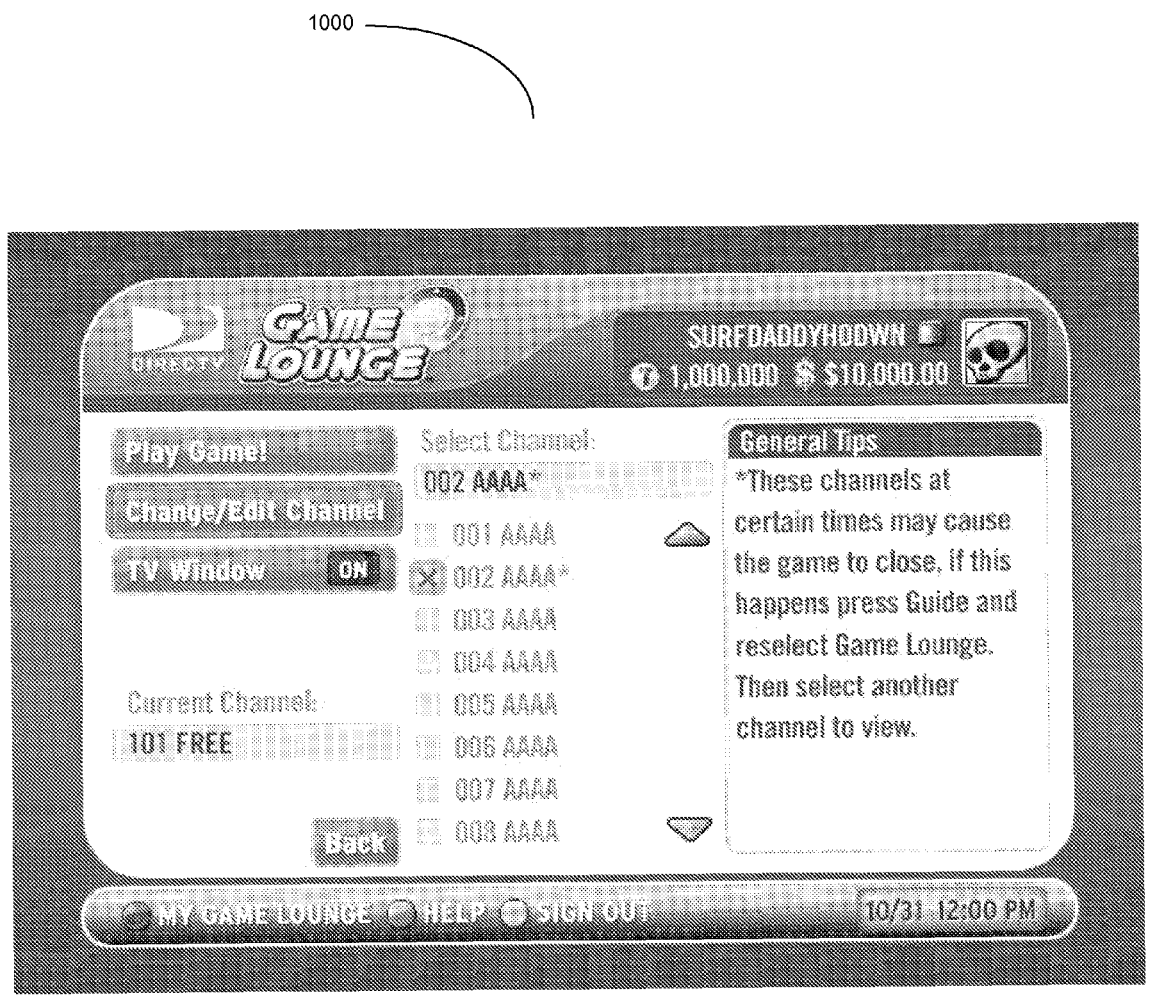
FIG. 10 illustrates a selection of game channels in accordance with the present invention.

FIG. 10 illustrates a selection of game channels in accordance with the present invention.

Screen 1000 illustrates that there are several channels, i.e., several possible channels that comprise games available to the viewer/player, and that the viewer/player can select from each of these channels as needed. For example, certain games may be available only to people that receive specific channels on their IRD 112, or specific channels or transponders may be at or near capacity which may cause certain games to be unavailable at certain times.

Incorporated in the invention is a the ability to alert the user of system or service events. These 'alerts' are displayed in the message bar and take the form of text ticker messages. Examples of alerts would be if the service is down for repair, there is new news, or if a new games schedule was pending.

Conclusion

The present invention comprises an interactive gaming channel presented on a monitor, with a plurality of transponders being used to present the games available at a given time. Such a channel in accordance with the present invention comprises a game selection screen, comprising a genre selection area and a game selection area, related to the genre selection area, wherein a viewer of the monitor selects a game to be played from a plurality of games.

Such a channel further optionally comprises each transponder in the plurality of transponders being used to send only a portion of the interactive gaming channel, each transponder in the plurality of transponders using less than a full viewer channel's bandwidth to send the portion of the interactive gaming channel, each transponder sending only a portion of the plurality of games, each transponder in the plurality of transponders using less than a full viewer channel's bandwidth to send the portion of the plurality of games, a receiver, for receiving plurality of games and the interactive gaming channel from the plurality of transponders, the receiver further comprising a gaming platform, the interactive gaming channel comprising a plurality of genres of games, each genre of games in the plurality of genres of games comprising games specific to a given gaming platform, at least one genre of games having a restricted access, and the interactive gaming channel having a restricted access.

An apparatus for displaying an interactive gaming channel with a plurality of transponders sending signals used to present the games available at a given time in accordance with the present invention comprises a broadcast delivery system, comprising a transmitter and a receiver, a monitor, coupled to the receiver, for selectively displaying the interactive gaming channel, the interactive gaming channel comprising a game selection screen, a genre selection area, and a game selection area, from wherein a game selected from a plurality of games is selectively chosen, a processor, coupled to the monitor and the receiver, the processor processing the signals from the plurality of transponders; and an input device, coupled to the processor, for inputting at least one selected game into the processor.

Such an apparatus further optionally comprises the broadcast delivery system being a satellite television delivery system, each transponder in the plurality of transponders being used to send only a portion of the interactive gaming channel, each transponder in the plurality of transponders using less than a full viewer channel's bandwidth to send the portion of the interactive gaming channel, each transponder sending only a portion of the plurality of games, each transponder in the plurality of transponders using less than a full viewer channel's bandwidth to send the portion of the plurality of games, a receiver, for receiving plurality of games and the interactive gaming channel from the plurality of transponders, the receiver further comprising a gaming platform, the interactive gaming channel comprising a plurality of genres of games, each genre of games in the plurality of genres of games comprising games specific to a given gaming platform, and at least one genre of games having a restricted access.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description but by the claims appended hereto and the full range of equivalents to the claims appended hereto.

What is claimed is:

1. An interactive system for presenting an interactive gaming channel on a monitor, with a plurality of transponders being used to present games available on the interactive gaming channel at a given time, comprising:
   a receiver for receiving separate signals wherein a programming guide is distinct from the interactive gaming channel, and wherein the interactive gaming channel is received via satellite, the separate signals used to form the interactive gaming channel comprising:
   a game selection screen, comprising:
      a genre selection area; and
      a game selection area, related to the genre selection area, wherein a bandwidth of the game selection screen, the genre selection area, and the game selection area is less than a viewer channel, wherein inputs to the receiver select a game to be played from a plurality of games, and a plurality of separate signals from the plurality of transponders are combined to graphically present the interactive gaming channel on the monitor; and
   wherein:
      use of a capacity of one or more of the plurality of transponders causes one or more games to be unavailable; and
      the receiver is configured to display an alert regarding the unavailability of the one or more games.

2. The interactive system of claim 1, wherein each transponder in the plurality of transponders uses less than a full viewer channel's bandwidth to send the portion of the interactive gaming channel.

3. The interactive system of claim 1, wherein each transponder sends only a portion of the plurality of games.

4. The interactive system of claim 1, wherein each transponder in the plurality of transponders uses less than a full viewer channel's bandwidth to send the portion of the plurality of games.

5. The interactive system of claim 1, wherein the receiver further comprises a gaming platform.

6. The interactive system of claim 5, wherein the interactive gaming channel comprises a plurality of genres of games, each genre of games in the plurality of genres of games comprising games specific to a given gaming platform.

7. The interactive system of claim 5, wherein at least one genre of games has a restricted access.

8. The interactive system of claim 1, wherein the interactive gaming channel has a restricted access.

9. An apparatus for displaying an interactive gaming channel, with a plurality of transponders each sending simultaneous separate signals used to present games available on the interactive gaming channel at a given time, comprising:
- a broadcast delivery system, comprising a transmitter and a receiver;
- a monitor, coupled to the receiver, for selectively displaying the interactive gaming channel and a programming guide, the programming guide being distinct from the interactive gaming channel, and wherein the interactive gaming channel is received via satellite, the interactive gaming channel comprising a game selection screen, a genre selection area, and a game selection area, from wherein a game selected from a plurality of games is selectively chosen, wherein a bandwidth of the game selection screen, the genre selection area, and the game selection area is less than a viewer channel;
- a processor, coupled to the monitor and the receiver, the processor processing the signals from the plurality of transponders by combining separate signals from the plurality of transponders to graphically present the interactive gaming channel on the monitor; and
- an input device, coupled to the processor, for inputting information corresponding to at least one selected game into the processor; and
- wherein:
  - use of a capacity of one or more of the plurality of transponders causes one or more games to be unavailable; and
  - the receiver is configured to display an alert regarding the unavailability of the one or more games.

10. The apparatus of claim 9, wherein the broadcast delivery system is a satellite television delivery system.

11. The apparatus of claim 9, wherein each transponder in the plurality of transponders uses less than a full viewer channel's bandwidth to send the portion of the interactive gaming channel.

12. The apparatus of claim 10, wherein each transponder sends only a portion of the plurality of games.

13. The apparatus of claim 12, wherein each transponder in the plurality of transponders uses less than a full viewer channel's bandwidth to send the portion of the plurality of games.

14. The apparatus of claim 10, further comprising a receiver, for receiving plurality of games and the interactive gaming channel from the plurality of transponders.

15. The apparatus of claim 14, wherein the receiver further comprises a gaming platform.

16. The apparatus of claim 15, wherein the interactive gaming channel comprises a plurality of genres of games, each genre of games in the plurality of genres of games comprising games specific to a given gaming platform.

17. The apparatus of claim 15, wherein at least one genre of games has a restricted access.

18. An interactive system for presenting an interactive gaming channel on a monitor, with a plurality of transponders being used to present games available on the interactive gaming channel at a given time, comprising:
- a receiver for receiving separate signals wherein a programming guide is distinct from the interactive gaming channel, and wherein the interactive gaming channel is received via satellite, the separate signals used to form the interactive gaming channel comprising:
- a game selection screen, comprising:
  - a genre selection area; and
  - a game selection area, related to the genre selection area, wherein a bandwidth of the game selection screen, the genre selection area, and the game selection area is less than a viewer channel, and wherein inputs to the receiver select a game to be played from a plurality of games, and a plurality of separate signals from the plurality of transponders are combined to graphically present the interactive gaming channel on the monitor; and
- wherein:
  - use of a capacity of one or more of the plurality of transponders causes the interactive gaming channel to be unavailable; and
  - the receiver is configured to display an alert regarding the unavailability of the interactive gaming channel.

19. An apparatus for displaying an interactive gaming channel, with a plurality of transponders each sending simultaneous separate signals used to present games available on the interactive gaming channel at a given time, comprising:
- a broadcast delivery system, comprising a transmitter and a receiver;
- a monitor, coupled to the receiver, for selectively displaying the interactive gaming channel and a programming guide, the programming guide being distinct from the interactive gaming channel, and wherein the interactive gaming channel is received via satellite, the interactive gaming channel comprising a game selection screen, a genre selection area, and a game selection area, from wherein a game selected from a plurality of games is selectively chosen, wherein a bandwidth of the game selection screen, the genre selection area, and the game selection area is less than a viewer channel;
- a processor, coupled to the monitor and the receiver, the processor processing the signals from the plurality of transponders by combining separate signals from the plurality of transponders to graphically present the interactive gaming channel on the monitor; and
- an input device, coupled to the processor, for inputting information corresponding to at least one selected game into the processor;
- wherein:
  - use of a capacity of one or more of the plurality of transponders causes the interactive gaming channel to be unavailable; and
  - the receiver is configured to display, on the monitor, an alert regarding the unavailability of the interactive gaming channel.

* * * * *